United States Patent [19]

Desvérchere

[11] 3,950,576
[45] Apr. 13, 1976

[54] METHOD OF LOCALLY IMPREGNATING SEALING MATERIALS WITH A FLUID-TIGHT IMPREGNANT

[75] Inventor: Jean Desvérchere, Lyon, France

[73] Assignee: Societe Anonyme dite: Cefilac, Paris, France

[22] Filed: Apr. 15, 1974

[21] Appl. No.: 460,896

[30] Foreign Application Priority Data
Apr. 20, 1973 France .............................. 73.14656

[52] U.S. Cl. ................ 427/284; 277/135; 427/275; 427/285; 427/287; 427/288
[51] Int. Cl.$^2$............................................ B05D 5/00
[58] Field of Search . 117/37 R, 38, 43, 44, 126 AF, 117/126 AB, 126 AQ, DIG. 9; 118/50, 301, 406; 277/13, 135; 427/209, 256, 271, 272, 275, 282, 284, 285, 287, 288

[56] References Cited
UNITED STATES PATENTS

| 1,932,912 | 10/1933 | Rosner..................... 117/126 AQ X |
| 3,477,867 | 11/1969 | Hillier...................................... 117/4 |
| 3,606,360 | 9/1971 | Barker ............... 277/227 |
| 3,650,804 | 3/1972 | Parisi..................................... 117/49 |
| 3,737,169 | 6/1973 | Glynn ............................. 117/43 X |
| 3,770,480 | 11/1973 | Farnam.................................... 117/4 |

Primary Examiner—Thomas J. Herbert, Jr.
Assistant Examiner—Bruce H. Hess
Attorney, Agent, or Firm—Brisebois & Kruger

[57] ABSTRACT

Impregnating porous material such as sealing materials by introducing a viscous liquid impregnating material under high pressure into the surface of a limited zone of said porous material.

20 Claims, 3 Drawing Figures

U.S. Patent   April 13, 1976   3,950,576
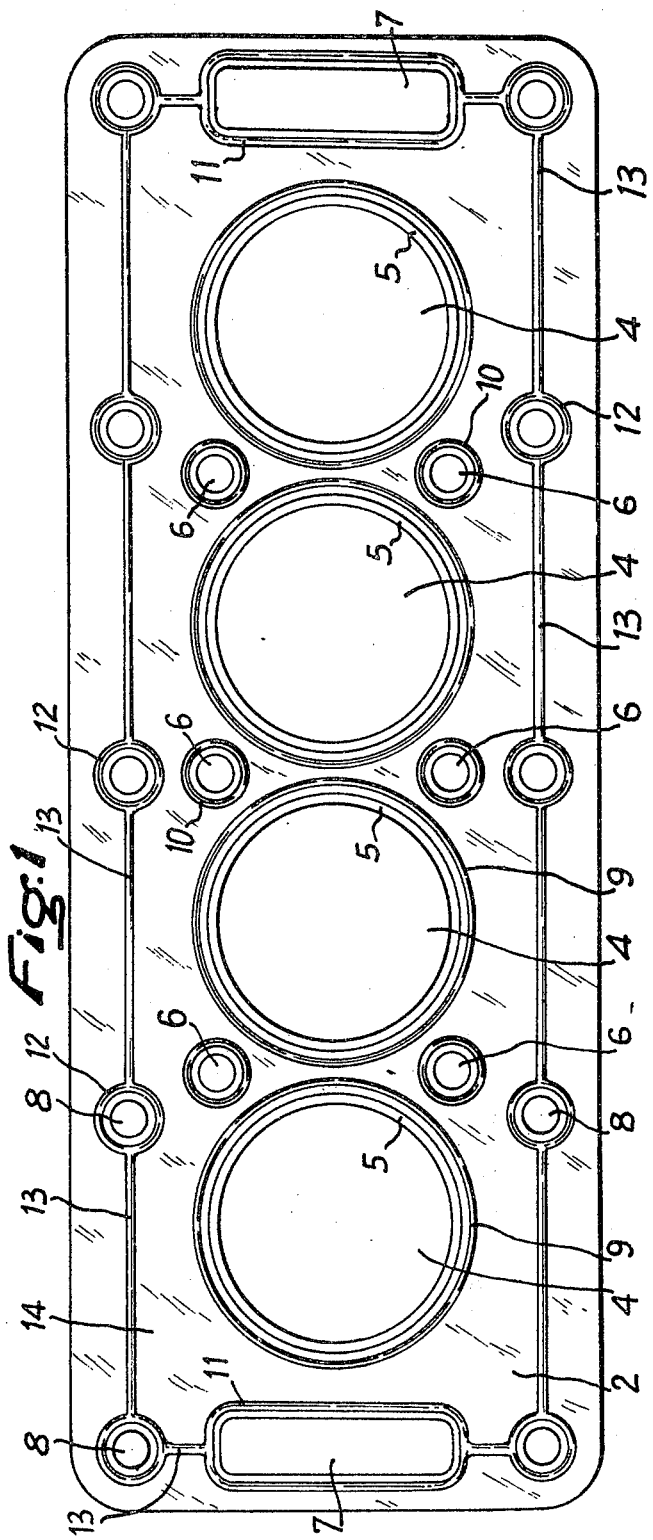

METHOD OF LOCALLY IMPREGNATING SEALING MATERIALS WITH A FLUID-TIGHT IMPREGNANT

This invention relates to a process of impregnating materials such as sealing materials and especially materials having a fibrous composition, for example, those materials having a base of fibrous asbestos. The invention also relates to a device for carrying out said process as well as to the materials and seals produced thereby.

The manufacture of seals, and especially flat seals such as cylinder head seals, requires the solution of two problems which are often contradictory. Additionally, for reasons of economy, it is necessary to use inexpensive materials, for example asbestos cardboard, but it is also necessary to obtain seals which are fluid tight. This is becoming more and more important and, by way of example, the fluid-tightness of the seals for cylinder heads both at the level of the fire rings and at that of the liquid passages must be greater and greater to take into account the performances required of the motors.

Up to the present, in order to increase the fluid-tightness of such seals and especially of flat seals made from relatively porous materials such as asbestos fibers, the sealing material has been impregnated by a material capable of insuring a certain fluid-tightness and this is done either at the time the sealing material is manufactured, for example by mixing this material in the form of a solution or suspension in the paste which is to be used in the manufacture of the sealing material, or after manufacture of the sealing material by soaking it, for example a sheet of asbestos, in a bath of impregnating material.

These processes are, however, expensive because they involve the consumption of a large quantity of impregnating material which must impregnate the entire mass of the sealing material even though they do not produce a very high degree of fluid-tightness. By way of example, the cylinder head seals made of asbestos and impregnated in this manner do not insure fluid-tightness at pressures greater than 2 or 3 bars.

The present invention proposes to overcome these disadvantages and provide a process for impregnating materials and particularly sealing materials, especially cylinder head joints, which makes it possible to obtain at commercial speeds of operation materials and seals having greatly improved impregnating properties while remarkably reducing the proportions of impregnating material consumed. The invention also proposes to provide a device for carrying out this process.

It is an object of the present invention to provide a method of impregnating a porous material such as a sealing material characterized by the fact that, in a limited zone of the material, for example the zone intended to form a local fluid-tight barrier, an impregnating material, for example a sealing material in the form of a viscous liquid, is introduced under high pressure through the surface of said limited zone.

As used in this specification the term "porous material" is used to identify materials capable of permitting the diffusion of certain liquids therethrough under sufficient pressures. These materials may be fibrous materials, for example composed of asbestos fibers, vegetable fibers or mineral fibers, or even natural or synthetic textile fibers. These porous materials may also be of leather, sintered metal, ceramics, or other like materials.

In accordance with one characteristic of the process according to the invention a fluid-tight member is applied around the periphery of the surface area through which the liquid penetrates at a pressure greater than that of the liquid against said surface.

The viscosity of the liquid, which may be a solution or a suspension of an impregnating material, is advantageously between 100 and 2,000 centipoises and, in a preferred embodiment of the invention, especially adapted to the impregnation of asbestos materials, the viscosity is about 1,000 centipoises.

The pressure is preferably between 2 and 100 bars and more, and for materials having an asbestos base or like materials may advantageously be of the order of 50 bars. Among the viscous materials which make it possible to obtain an adequate fluid-tightness are solutions of silicones, elastomers, thermosetting materials, thermoplastic materials, and thermostable materials. These materials are chosen in dependence upon their capabilities for increasing the fluid-tightness of the locally impregnated material. Qualities other than fluid-tightness may also be sought and, in particular, the impregnating materials may be adapted to form foams by heat treatment of the zone of the material which contains them in order to locally increase the elastic properties of the material. The foams may be, for example, elastic foams or elastomeric foams.

Alternatively, it is also possible to introduce into the material a material such as a phenolic resin which imparts to the surface of the treated zone a resistance to compression which makes it possible, when the material is then gripped during its utilization, for example between the motor block and the cylinder head, to prevent flow of the material in response to the pressure of the liquid or the gas.

In accordance with a preferred method of carrying out the process according to the invention the localized zone receiving the material forms a continuous line which is generally closed on itself.

This form of continuous line may be obtained either by the continuous application of material to the zone corresponding to said surface or by discontinuous application at closely adjacent points so that continuity of the material of the impregnated zone results from the local diffusion of the impregnating material in the base material.

It is a further object of the present invention to provide a device for carrying out this process characterized by the fact that it comprises a rigid member having a face adapted to be applied against the surface of the material, means for applying said face against said surface under a high pressure, at least one narrow orifice in said face to admit the liquid to the surface corresponding to the zone to be impregnated, and means for leading the liquid under high pressure into said orifice.

In a preferred embodiment adapted for example to permit the manufacture of a fluid-tight line in the material, the face of the device is provided with a continuous groove supplied by one or more ducts so that the liquid under pressure fills the groove and penetrates the surface of the material adjacent the groove.

In such an embodiment, by applying a sufficient pressure to the device to compress the material of the seal, the zone of the material positioned above the groove is less compressed by the low pressure of the liquid and it is thus possible to obtain on the surface of the material a line of impregnated material the superficial part of which is positioned in relief along the line of groove.

The width of the groove may advantageously lie between 0.5 and 5 mm.

It is a further object of the present invention to provide materials such as sealing materials and seals made from such materials, especially cylinder head seals, characterized by the fact that they have one or more localized zones of impregnated material densely impregnated by an impregnating material, for example a material which imparts fluid-tightness.

Preferably the impregnated zone extends through the entire thickness of the material of the seal.

In an advantageous manner the impregnated zone or zones extend continuously along closed lines defining fluid-tight portions, for example, in a cylinder head joint, especially around the orifices through which the liquids or gases pass through the seal.

Other advantages and characteristics of the invention will appear from a reading of the following description given purely by way of illustration and example, with reference to the accompanying drawing, in which:

FIG. 1 is a plan view of a cylinder head seal according to the invention;

FIG. 2 is a schematic partial sectional view through a device according to the invention for use in manufacturing the seal of FIG. 1; and FIG. 3 is a partial sectional view taken through FIG. 2 after completion of the process.

The cylinder head seal represented on the drawing comprises in a conventional manner a metallic reinforcement made of a sheet of metal having a thickness of about 0.20 mm and conventionally equipped with perforations and projections in the manner of a rasp, said perforations not being shown on the drawing. The metallic sheet 1 is coated on its two surfaces by two sheets of asbestos 2 and 3 having, when uncompressed, a thickness of the order of 0.5mm. These sheets of asbestos are also well known in themselves. The seal assembled in this manner is rectangular in form and provided with four large orifices 4 which pass therethrough and are aligned and coincident with the cylinders of a motor block. The peripheries of the four orifices 4 are provided in a conventional manner with metallic fire rings 5 inserted in the material of the seal. The seal also has six smaller circular orifices 6 situated near the orifices 4 and adapted for the passage of water for cooling the motor. At the two ends of the seal two larger rectangular orifices 7 are adapted to permit passage of the oil, and 10 orifices 8 positioned about the periphery of the seal are adapted to admit fastening bolts in a conventional manner.

In accordance with the invention, each of the orifices 4, 6, 7 and 8 is encircled at a short distance from its periphery by impregnated lines 9-12 on the two surfaces of the seal. These impregnated lines have a width of about 3 mm and extend through the entire thickness of the material from the free surface of the layer 2 on one side to the free surface of the layer 3 on the other. This is also true of the supplementary straight lines 13 which connect the various lines 12 encircling the orifices which permit passage of the bolts 8 and the lines 11 of the orifices which permit passage of oil 7 so as to surround an inner surface 14 containing the orifices 4 and 6. In order to make the lines of the seal according to the invention the seal is initially positioned without the fluid-tight lines on a plate 15 so as to leave visible the upper layer 2. A metal block 16 is then placed on the upper surface of the layer 2. The flat base 17 of this block is applied exactly on the seal represented on FIG. 1. The flat surface 17 of the block 16 is provided with a plurality of grooves positioned exactly along the lines 9-13 represented on FIG. 1. Thus, the surface 17 has four annular grooves defining four circles of large diameter corresponding to the lines 9 and smaller continuous annular grooves along the lines 10 and 12, with the grooves corresponding to the lines 11 and the straight lines extending in the direction of the lines 13 and opening respectively into the grooves which correspond to the lines 12 and 11. FIG. 2 shows a transverse section through such a groove 18 having a width of 3 mm.

A certain number of vertical ducts 19 open into these grooves to supply them with a liquid sealing material. The surface 17 of the member 16 is applied to the cylinder head seal as shown on FIG. 2 while being suitably centered so that the different grooves are positioned in a proper manner concentrically with the corresponding orifices 4, 6, 7 and 8. The member 16 is then compressed by hydraulic jacks (not shown) in the direction of the plate 15 so as to exert a pressure of 100 bars on the seal. In response to this pressure, the seal is compressed except for the asbestos part 20 positioned opposite the different grooves. One then injects a solution of silicone in the direction of the arrow F through the ducts 19 so that this solution, introduced under a pressure of 50 bars, penetrates through the ducts such as 18 and occupies the entire volume of said grooves.

In response to said pressure the liquid penetrates into the material through the surface of the zone 20 and diffuses inside the asbestos layer 3 until it reaches, as shown in FIG. 3, the metallic sheet 1. The liquid diffuses laterally so that it finally produces a line such as 11 having a width of 5 mm. When this width of line is reached, no further pressure is exerted on the liquid and the member 16 is removed to release the seal.

The seal is then turned over so that the layer 3 is located at the top and the operation just described is duplicated. It is also possible instead of initially placing the layer 3 on a plate such as 15 to have two members 16 which are symmetrically positioned with respect to the sheet 1, one of which is positioned above and the other below the seal in order to form a fluid-tight line simultaneously in the layers 2 and 3.

The tests which have been carried out with a seal such as the one illustrated in FIG. 1 show that complete fluid-tightness may be obtained up to a pressure of 10 kg of liquid in the orifices such as 6 and 7. This represents a much greater resistance than it has heretofore been possible to obtain with conventional impregnated seals while utilizing only about a tenth as much impregnating material.

It also follows that it is possible to eliminate the skirts, that is to say, the small metallic rings analogous to the fire rings which have heretofore encircled the orifices such as 6 and 7 in order to improve the seal at these points.

In another embodiment of the invention it is possible to fabricate seals analogous to the one shown in FIG. 1 by stacking in alignment a certain number of seals which have no fluid-tight lines so that the axis of their various orifices are aligned. The stack of seals is then compressed and the sealing liquid is introduced under pressure into orifices such as 6, 7 and 8. The sealing material then diffuses from the edge of the two orifices for a certain depth. In this case the sealing lines which are obtained are not positioned exactly like those in FIG. 1 but are, on the contrary, directly adjacent the walls of the various orifices 6, 7 and 8. The same operation may be carried out with orifices of larger diameter such as 4, provided that the impregnating step is carried out in accordance with the invention before insertion of the fire rings 5.

It will be appreciated that the duration of the impregnating period depends in part on the nature of the impregnating substances and the pressure exerted on the liquid and in part on the nature of the material of the seal and on the thickness of the fluid-tight line which is to be obtained. It is obvious that this duration can easily be determined by a man skilled in the art for each practical application of the invention.

What is claimed is:

1. Method of locally impregnating a porous sealing material which comprises the steps of
    locating a fluid tight member upon the outer surface of said material around a limited area of said outer surface, smaller than the total area of said surface, and
    introducing a viscous liquid impregnating material under high pressure into said limited area, until the porous material beneath said limited surface area is impregnated with said liquid,
    while simultaneously applying said member against said surface at a pressure greater than that exerted on the impregnating liquid.

2. Process as claimed in claim 1 which comprises the step of locating a fluid-tight member around the surface to be impregnated and applying said fluid-tight member to said sealing material at a pressure greater than that exerted on the impregnating liquid.

3. Process as claimed in claim 1 in which the viscosity of the liquid is between 100 and 2,000 centipoises.

4. Process as claimed in claim 3 in which the viscosity of the liquid is about 1,000 centipoises.

5. Process as claimed in claim 1 in which the pressure of the liquid is between 2 and 100 bars.

6. Process as claimed in claim 5 in which the pressure of the liquid is of the order of 50 bars.

7. Process as claimed in claim 1 in which said viscous liquid is a sealing liquid.

8. Process as claimed in claim 1 which comprises the step of introducing into said zone a liquid which increases the frictional resistance of the surface of the impregnated zone.

9. Process as claimed in claim 1 which comprises the step of introducing into said zone a liquid capable of foaming when the zone is subsequently heated.

10. Process as claimed in claim 1 which comprises the step of impregnating a zone in the form of a line.

11. Process as claimed in claim 10 in which the line is closed.

12. Process as claimed in claim 1 which comprises the step of continuously applying the liquid to the corresponding surface of the zone.

13. Process as claimed in claim 1 which comprises the step of applying liquids at a plurality of closely spaced points on the surface corresponding to said zone.

14. Process according to claim 1 for impregnating flat perforated seals which comprises the step of introducing the liquid into zones in the form of continuous lines encircling certain orifices extending through the seals.

15. Process as claimed in claim 1 especially for impregnating flat seals which comprises the step of superposing a plurality of flat sheets and introducing the liquid under pressure through the edges of the material of said sheets.

16. Material made by the method of claim 1 comprising a plurality of locally impregnated zones directly impregnated with an impregnating material.

17. Materials and seals as claimed in claim 16 in which the impregnated zone passes through the entire thickness of the material.

18. Material as claimed in claim 16 in which each of said impregnated zones extends in a continuous closed line.

19. Material as claimed in claim 16 in which said impregnated zones project from the adjacent surface of said material.

20. Material as claimed in claim 16 formed into a cylinder head seal provided with orifices therein, said orifices being surrounded by zones impregnated with a sealing material.

* * * * *